Aug. 25, 1936.  B. E. GETCHELL  2,052,396
ELECTRIC HEATING OF LIQUIDS
Filed Nov. 9, 1934   6 Sheets-Sheet 1

INVENTOR
BENJAMIN E. GETCHELL
BY
ATTORNEY

Aug. 25, 1936.  B. E. GETCHELL  2,052,396
ELECTRIC HEATING OF LIQUIDS
Filed Nov. 9, 1934  6 Sheets-Sheet 2
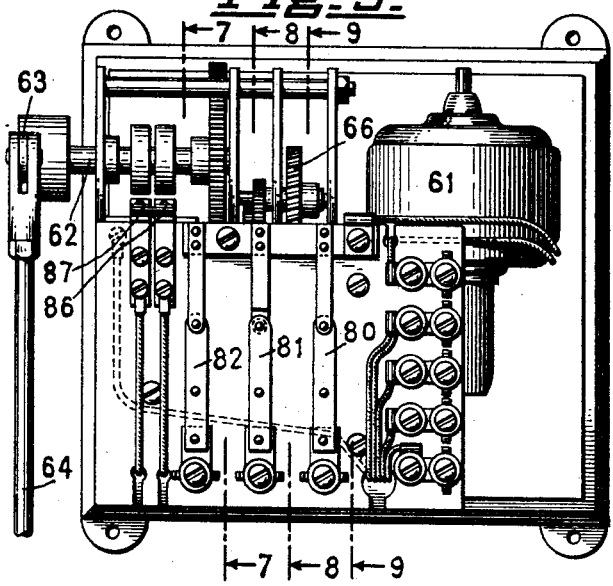
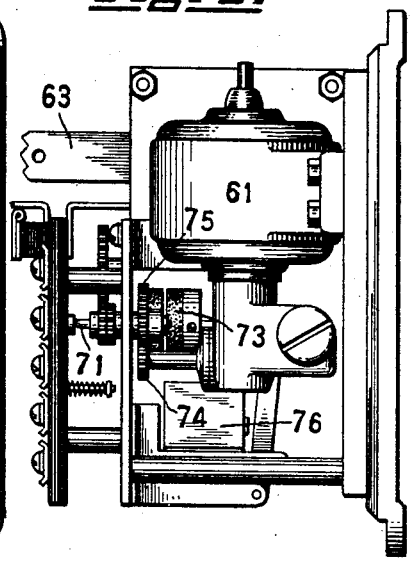
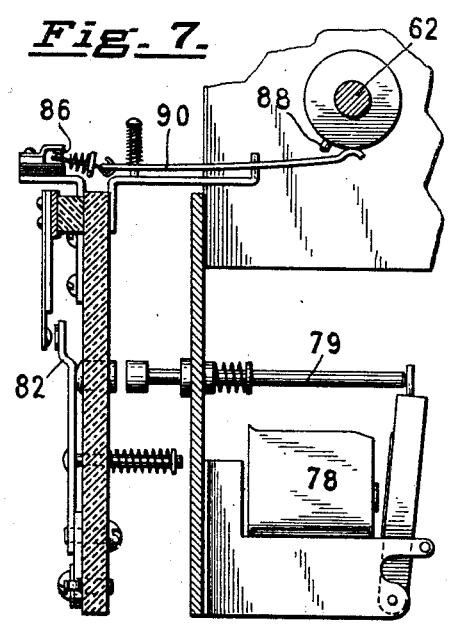
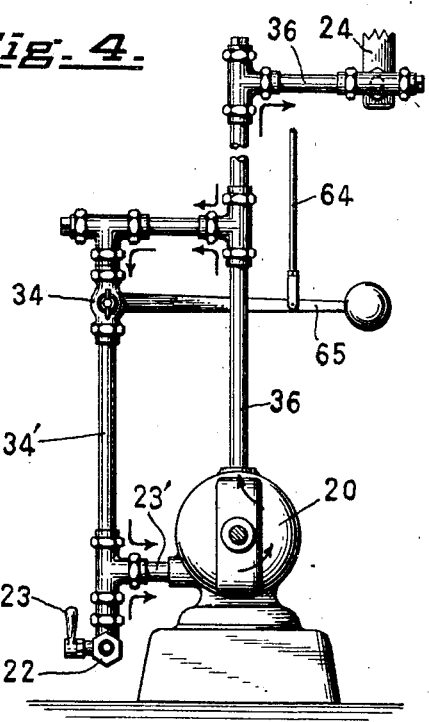
INVENTOR
BENJAMIN E. GETCHELL,
BY
ATTORNEY Aug. 25, 1936.   B. E. GETCHELL   2,052,396
ELECTRIC HEATING OF LIQUIDS
Filed Nov. 9, 1934   6 Sheets-Sheet 3
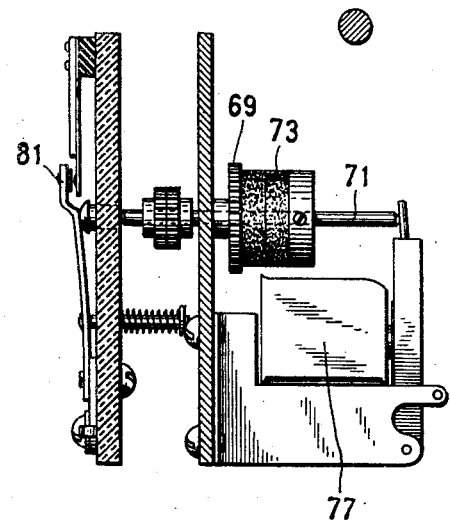
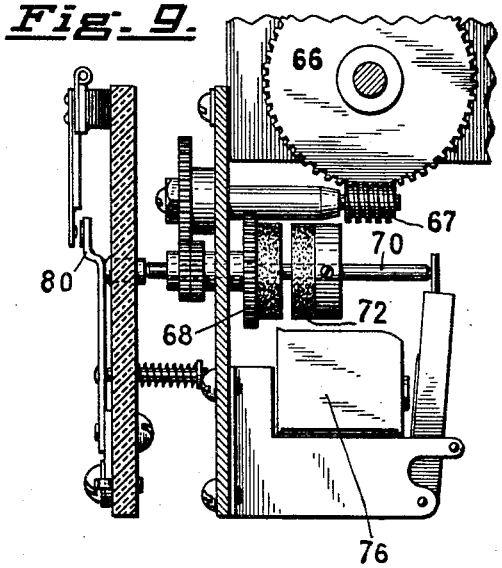
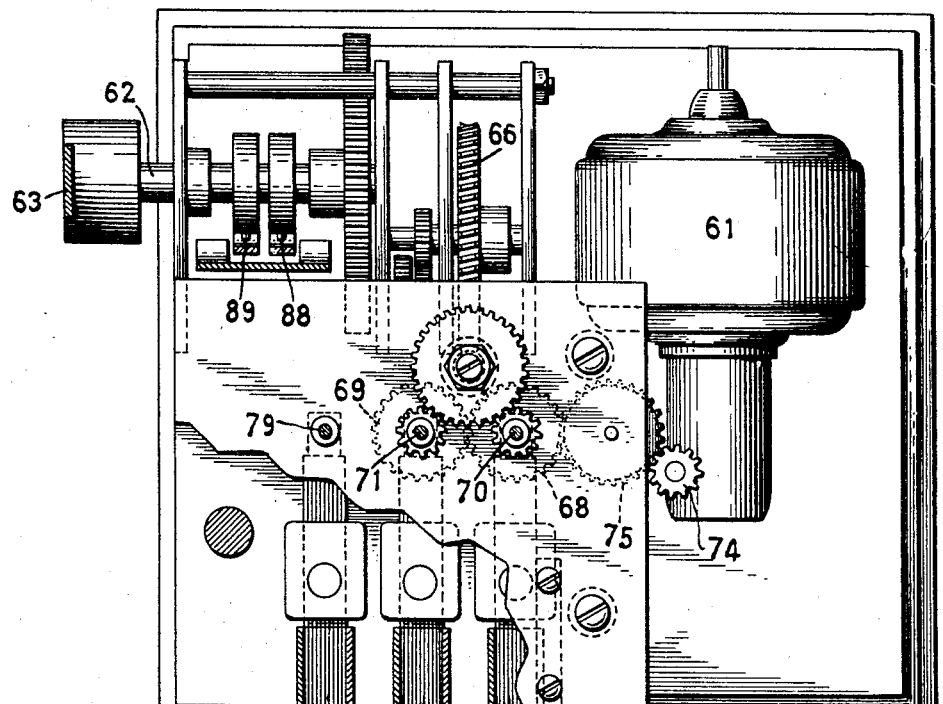
INVENTOR
BENJAMIN E. GETCHELL,
BY
ATTORNEY

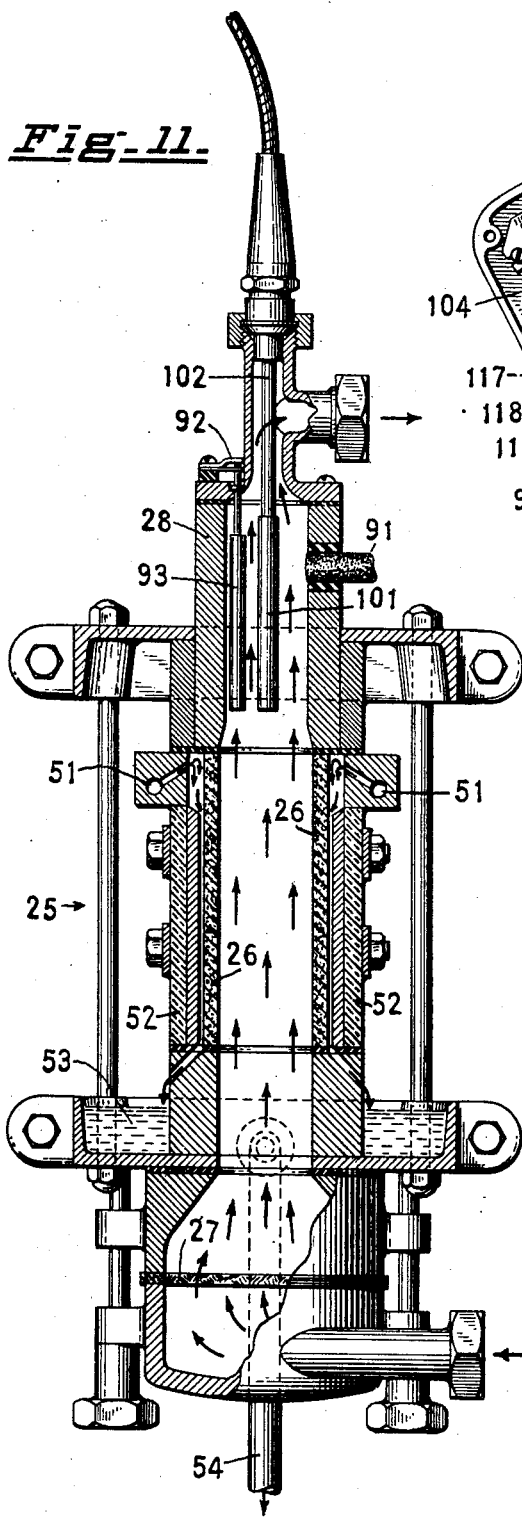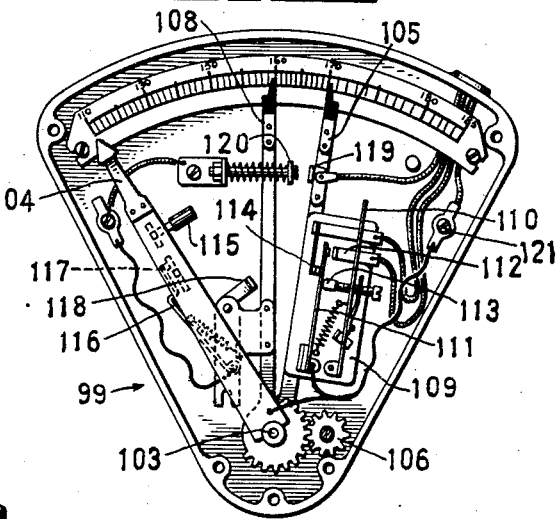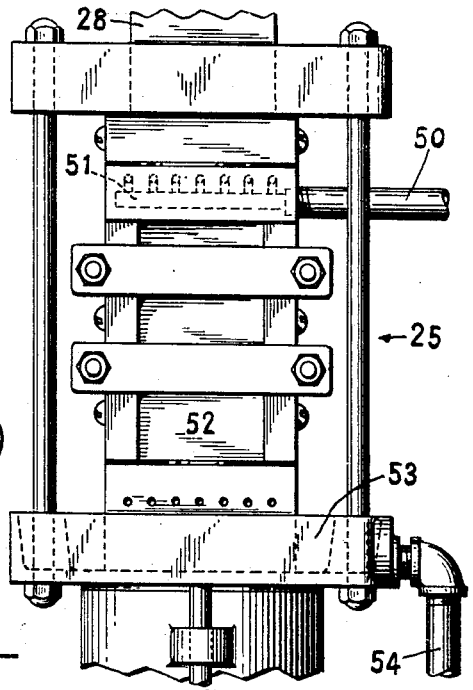

Aug. 25, 1936.  B. E. GETCHELL  2,052,396
ELECTRIC HEATING OF LIQUIDS
Filed Nov. 9, 1934  6 Sheets-Sheet 5
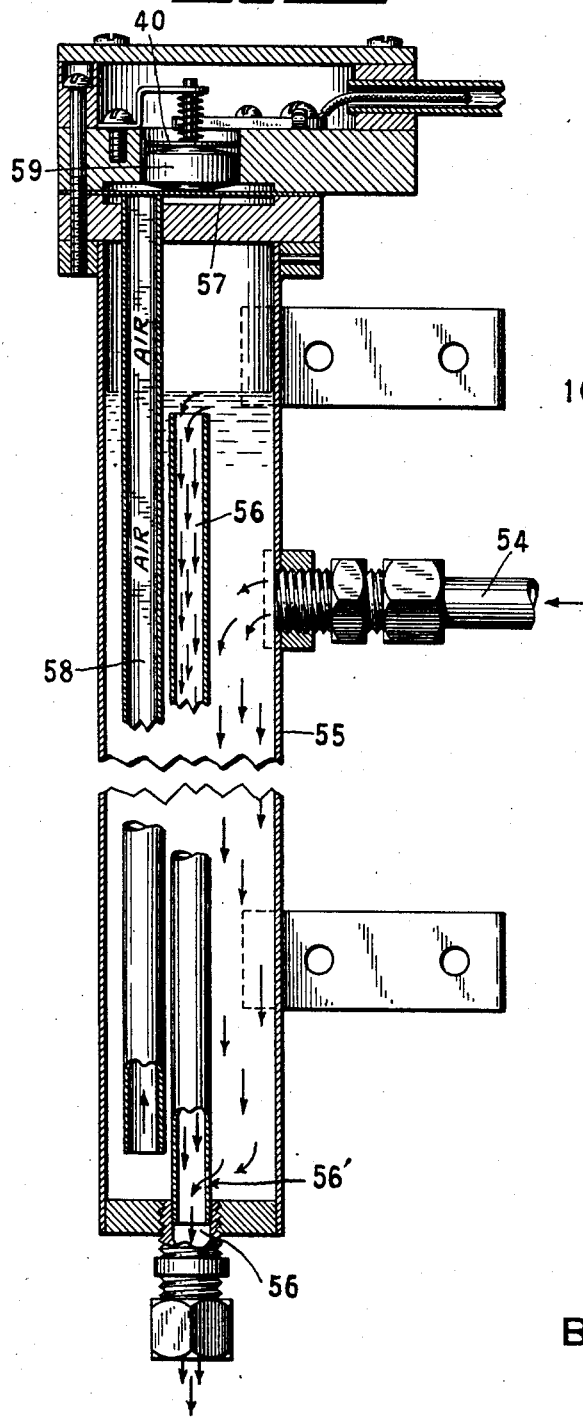
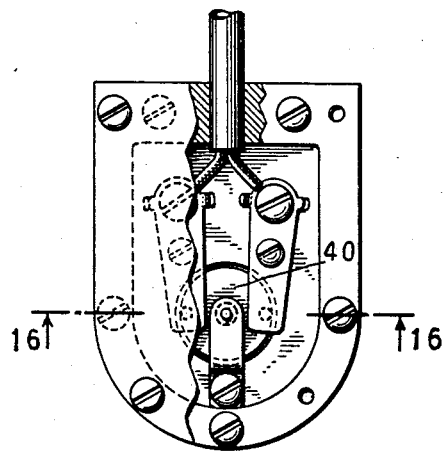
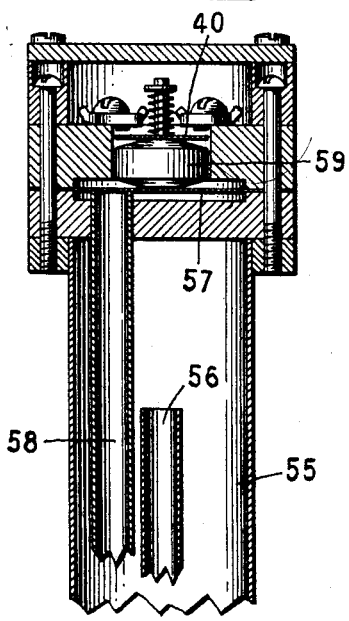
INVENTOR
BENJAMIN E. GETCHELL,
BY
ATTORNEY

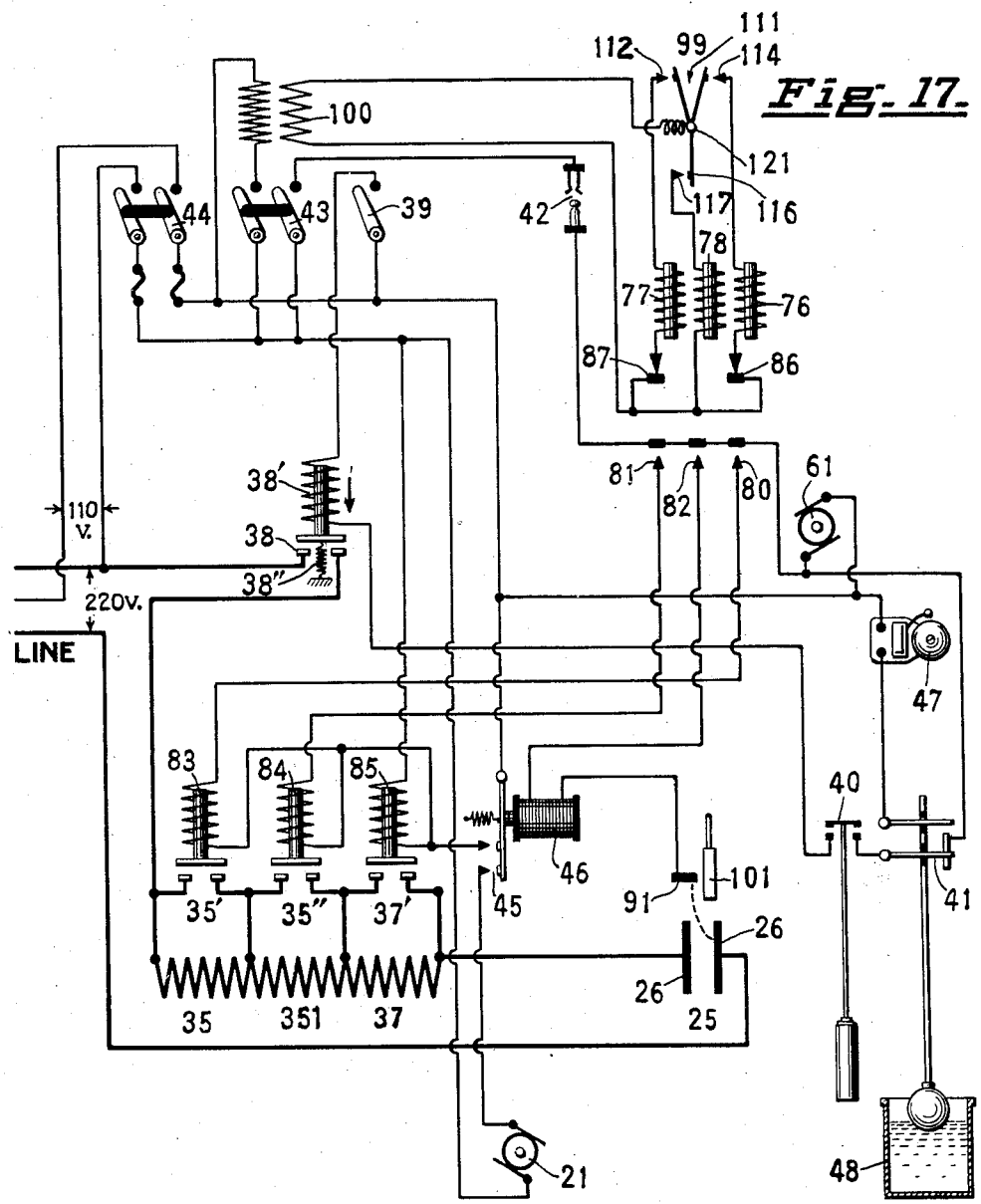

Patented Aug. 25, 1936

2,052,396

UNITED STATES PATENT OFFICE 2,052,396

ELECTRIC HEATING OF LIQUIDS

Benjamin E. Getchell, Plainville, Conn., assignor to The Trumbull Electric Manufacturing Company, Plainville, Conn., a corporation of Connecticut Application November 9, 1934, Serial No. 752,223

49 Claims. (Cl. 219—40)

My invention relates to a system and apparatus for electrically heating and treating a stream of liquid to a predetermined temperature and particularly for the purpose of pasteurizing.

One object is to control the temperature accurately within a narrow predetermined range.

Another object is to provide a practical, reliable and efficient process.

Another object is to provide a system which is wholly automatic after it is started even when the temperature of the supplied liquid varies or if the temperature or pressure of the air varies.

Another object is to provide a system through which it is impossible for the liquid to pass without being properly heated.

The form of apparatus shown and described is especially adapted to the treatment of milk and has been found most effective. By its use milk or other liquid can be pasteurized to the fullest degree required by the most exacting rules and without reducing the cream line of the milk, affecting the flavor or otherwise injuring the milk.

In order to simplify the description, I will refer to the liquid as milk and mention temperatures which are commonly met in practice.

A circulating system includes a motor-driven pump, an electrode chamber in which the milk is heated by the passage of alternating current and a regeneration section heated by the output of the heater, and all of which members are so located that when the pump stops the heated milk flows back or returns to the heating chamber for further treatment. The temperature of the treated milk is regulated by controlling the rate of movement or flow of the liquid through the heating chamber and by varying the strength of the heating current. This control of the flow of milk is governed partly by a thermostatic control contactor or special switch and partly by an electromagnetically actuated valve. This valve is intermittently actuated by a constant speed electric motor and a system of clutches and gears. The current strength in the heating chamber is also varied by the action of the thermostatic device. The thermostatic device is governed by the temperature of the treated milk. The electrodes are cooled by water and the apparatus can not operate unless cooling water is flowing over the electrodes.

Details of one form of apparatus are shown and described and may be claimed specifically in other applications.

Fig. 4 is a side elevation of the pump and of the valve control device as viewed from the left side of Fig. 1.

Fig. 5 is a vertical projection of the constant speed motor and associated gears and switches.

Fig. 6 is a side view of the same.

Fig. 7 is a section on the plane of the line 7—7 of Fig. 5.

Fig. 8 is a section on the plane of the line 8—8 of Fig. 5.

Fig. 9 is a section on the plane of the line 9—9 of Fig. 5.

Fig. 10 is a larger view of parts of Fig. 5, parts being broken away.

Fig. 11 is a vertical section of the heater and shows the electrode cooling means and the bulb or thermo-sensitive element of the contact controller.

Fig. 12 is a side view of the heater and cooling device of Fig. 11.

Fig. 13 shows the special thermal controlled switch or contactor.

Fig. 14 is a sectional view of the switch for controlling the main heating circuit and which is, itself actuated by the cooling water for the electrodes.

Fig. 15 is a plan view of the same with parts broken away.

Fig. 16 is a sectional view of the switch of Fig. 14 taken on the plane of the line 16—16 of Fig. 15.

Fig. 17 is a diagrammatic view of the electric circuits of the system.

Figure 1:
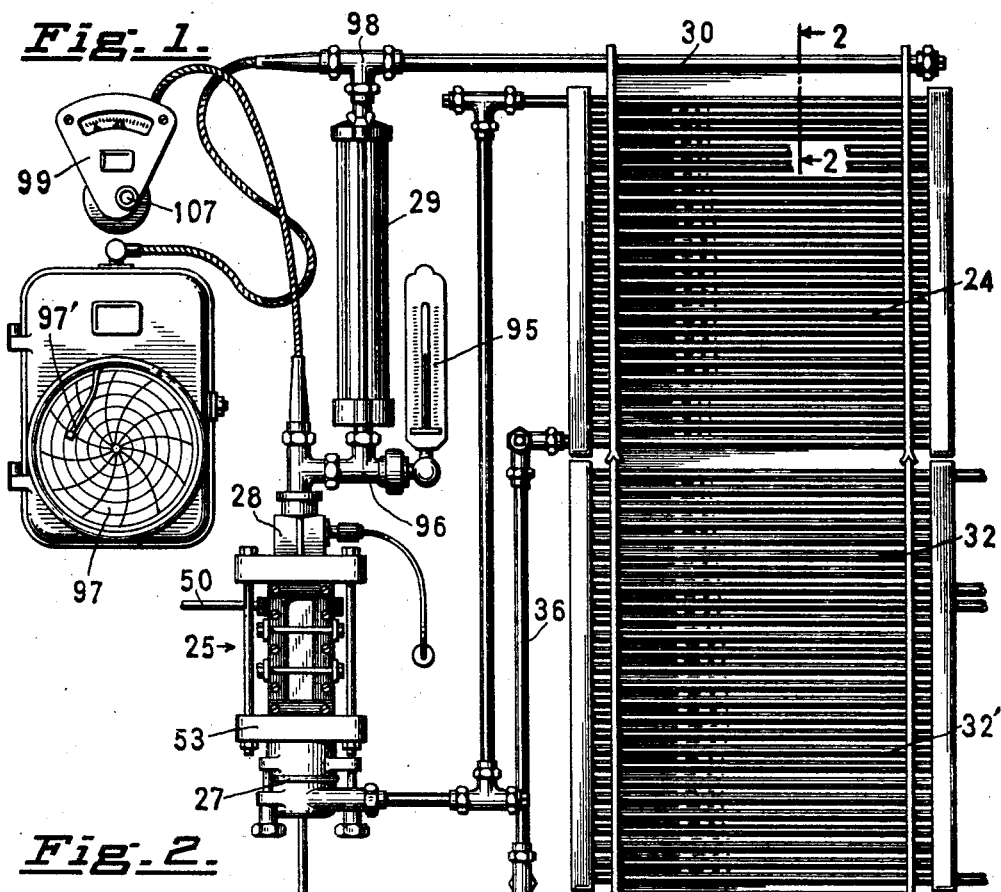
Fig. 1 is a front elevation of the pumping, heating, thermostatic and heat exchange parts of the system.
Figure 2:
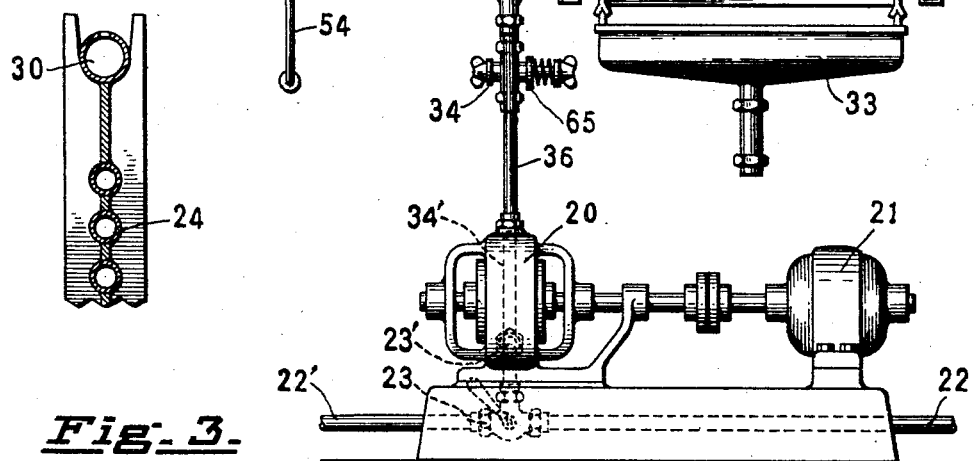
Fig. 2 is a fragmentary section of the heat exchange device on the plane of the line 2—2 of Fig. 1.
Figure 3:
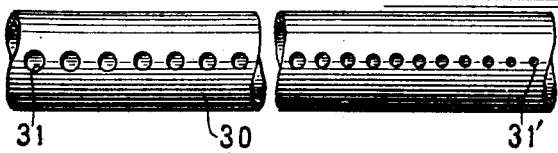
Fig. 3 is a plan view of fragments of the liquid sprinkler device.

The rotor of the pump 20 is preferably driven by an electric motor 21 and receives the liquid from a source 22 or 22', which may be selected by action of a valve 23. The pump is of such a type that the liquid can flow back when the pump stops.

A preheater or heat exchange section 24 or coil of the liquid conduit is arranged above the supply tank so as to ensure the return of the milk flow when the pump stops. The heating chamber 25 is so constructed as to facilitate cleaning and has electrodes 26—26 for instance of carbon or graphite, or other suitable conducting material. One or two walls of the chamber are preferably transparent so that the action in the chamber may be seen. The liquid may pass through the filter or strainer 27 before going to the heater. After heating, the liquid passes through an insulated block 28, thence through a sight chamber 29 which may be of larger diameter than the other passages so as to slow up the movement of the liquid to the sprinkler head 30 above the preheater section 24. The openings 31 in this head are largest at the entrance end and graded in size to the smallest 31' at the outer end so as to give a uniform jet or flow of the liquid from one end to the other across the preheater. The temperature of raw milk may vary considerably but is supposed to be approximately 50° F. The treated milk should attain not less than some predetermined temperature as, for instance 160° for high temperature pasteurization of milk and should be held as close above that point as is commerically practical. The preheater may be so designed as to raise the temperature to say 125° F. before it enters the electrode chamber. When it is desired to chill the treated milk to say 40° F. an additional refrigerating unit or units such as 32, 32' through which cooling water or brine may flow and over which the milk will cascade to the collecting trough 33, may be provided.

The rate of flow of the milk to be treated is varied by controlling a valve 34 which is located in a by-pass 34' connected from the feed pipe 36 to the pump intake 23'. The passages are so proportioned that part of the liquid always tends to pass through the valve 34. As the valve 34 is closed the rate of flow to the preheater increases and conversely when the valve is being opened the rate of flow to the preheater will decrease.

High potential current is not necessary in this system. I have obtained excellent results with an ordinary household lighting circuit at a potential of 220 volts and I control the value of current drawn from such supply by using resistances such as 35, 35! and 37 in series with one another and interposed as a whole in series with the supply. The respective individual resistances are provided with shunting-out switches 35', 35" and 37' actuated by electromagnetic controls 83, 45 and 85, respectively.

The switch 38 in the heating circuit is biased open by a spring 38" and is closed when electromagnet 38' is energized. This electromagnet can only be energized when the manual switch 39 is closed, the cooling-water-controlled switch 40 is closed, and the milk-supply float-switch 41, the plug switch 42, the control circuit switch 43 and the pump switch 44 are all closed.

The pump motor 21 is operated from the 110 volt supply circuit controlled by switches 44 and 45. The latter is spring biased to closed position under normal conditions but opened by the relay 46 in case the temperature of the milk falls below 160° as will be later described.

An alarm device 47 may be provided to sound when the milk in supply tank 48 is low.

The cooling water for the electrodes (Figs. 11 and 12) is supplied from pipe 50 and flows through the channels 51, and then down between the electrodes 26, 26 and the outer plates 52, 52 and into the trough 53. From here it flows through pipe 54 into a chamber 55 (Fig. 14). The overflow pipe 56 discharges at the bottom. A diaphragm 57 closes the top of this chamber and an air pipe 58 dips down into the chamber. The movable contact of the switch 40 is carried by a sort of piston 59 which rests on this diaphragm and is spring pressed downward. When water flows into the chamber 55 a little faster than it flows out through the hole or opening 56' a head is built up in the chamber sufficient to raise the diaphragm 57 and close the switch 40 and start the heating action if the switches 39, 41, 43 and 44 are also closed.

The liquid by-pass valve 34 is actuated indirectly by the constant speed motor 61 connected in the 110 volt circuit by the switches 43 and 44. The rock shaft 62 has an arm 63 which is connected by link 64 to a weighted arm 65 which is connected to the valve 34. This shaft 62 is driven in one direction or the other by the worm gear 66 and a reduction train. The gear 66 is driven by the worm 67 from one or the other gears 68, or 69 which are loose on the spindles 70 and 71. Clutch members 72 and 73 are fixed on these shafts 70 and 71 and rotate with them and transmit motion to the companion clutch members and their attached gears. These gears are driven all the time by the motor shaft and connected gears 74 and 75.

The electromagnets 76, 77 and 78 have armatures adapted when the magnets are energized to push the respective spindles 70, 71 and 79 so as to actuate the switches 80, 81 and 82. These switches control the circuits through the electromagnet coils 83, 84 and 85. Magnet coils 84 and 85 are connected in multiple with the pump motor circuit. The two valve limit switches such as 86 and 87 are in series with the magnets 76 and 77, which latter control the clutches 72 and 73 which last actuate the spindles and gearing to open and close the valve 34. These contacts are carried by snap action levers such as 90 (Fig. 7) and are actuated by the lugs 88 and 89 on shaft 62. When the valve 34 is opened or closed to its predetermined limits of movement, one of these switches is automatically opened thus preventing further movement of the valve.

The electromagnet 46 is a part of a relay which is operated so as to stop the pump when the temperature of the liquid drops below the predetermined minimum. One terminal of this relay circuit is connected to a member of the switch 82 above mentioned and the other terminal consists of a supplemental electrode 91 which is located in the insulated housing 28 above the heating chamber. The electrodes 91 and 26 together with the liquid stream constitute a switch in the pump motor control circuit.

Another form of switch for a similar purpose might consist of contacts 92 actuated by a float 93 in the housing 28 above the heating chamber as shown in Fig. 11.

The temperature of the liquid as it leaves the heating chamber may be shown by any suitable form of thermometer 95 having its bulb located in the T fitting 96.

It is also desirable to record the temperature of the heated liquid as, for instance, by a chart 97 driven in the usual manner and on which a record is drawn by a pen 97' actuated by a thermally responsive member located in the T fitting 98. The thermometer 95 serves to indicate the temperature of the liquid just after it has left the heating chamber and the recording device 97 serves to preserve a record of the temperature of the liquid just before it passes to the heat regenerator at the end of the heating period.

The thermostatic control of the various relays is accomplished by a suitable form of apparatus designed for the special purpose of this invention.

The automatic temperature control device 99 may be generally of conventional form but embodying special devices and circuits for the purpose of this invention. Current is furnished for this temperature control device either at 110 volts or from transformer 100 which preferably is designed to reduce the voltage of 110 volts to 20 volts. The thermal responsive device such, for instance, as a bulb 101 (Fig. 11) has a tube 102 extended to the temperature control device 99 and has a conventional type of torsional tube (not shown) connected to the shaft 103 of the arm 104. The bulb and tube are filled with an expansible fluid or gas.

This arm 104 is adapted to swing and its end serves as a pointer to indicate the temperature as the fluid expands and contracts with changes in liquid temperature above the heating chamber. The arm 105 is manually adjustable by means of a pinion 106 and knob 107 (see Fig. 1). The arm 108 is set at the predetermined selected minimum point. The arm 105 carries an insulating platform or plate 109 on which is mounted lever 110 which is spring connected to lever 111 also mounted on platform 109 so that the lever 111 is biased toward the contact 112 carried by platform 109. Lever 110 carries a mechanical pusher 113 which under normal conditions engages lever 111 so as to force it against the contact 114 also carried by platform 109.

Arm 104 carries a mechanical pusher 115 which is adapted to engage the lever 110 when the temperature reaches the point at which the device is set to operate. The arm 116 is normally biased in the direction of arm 104 and engages the contact 117 carried by arm 104. Stationary stop 118 carried by arm 108, however, is located in the path of movement of the arm 116 so as to break the electrical connection between the arm 116 and the contact 117 at a certain minimum temperature.

The arm 105 carries a contact 119 which, however, is insulated from the arm. Spring contact 120 engages the contact 119 at all temperatures below a certain predetermined maximum.

Four wires lead to the temperature control device. One of these wires has a common terminal electrically connected to the arm 104 and to the arm 111. This common terminal is designated by the reference number 121 in Fig. 17. One terminal called the "extra low" is in the 160° safety pump stop circuit of the control device. This circuit includes the contact 119, contact 120, arm 116 and contact 117 on arm 104. At all points below 170° (the selected maximum) 119 engages 120 and a circuit is completed through 116 and 117 to 104. This pump stop circuit energizes the coil of the relay magnet 78 which operates the switch member 82 to close the circuit of the relay 46 previously mentioned so that when the temperature falls below the minimum of say 160° the circuit between the contacts 119 and 120 is broken, the relay 78 is actuated to close the circuit through the switch 82, energize the relay 46 and open the switch 45 in the circuit of the pump motor 21.

This local circuit through the relay 46, it will be seen, depends upon the presence of liquid in the heating chamber so as to complete the circuit from electrode 91 to electrode 26. When the pump has been stopped long enough for the liquid to flow back into the heating chamber, circuit through the liquid between electrode 91 to electrode 26 is broken and the relay 46 deenergized so that the pump motor switch 45 is again closed and the pump motor started.

One terminal of the temperature control device is connected to the contact 112 which controls the high limit temperature. The remaining terminal is connected to the contact 114 for the control of what might be termed the normal low temperature. The high temperature control contact 112 is in circuit with the relay 77 which actuates the switch 81 in the circuit of the high temperature control relay 84. The low temperature control contact 114 is in circuit with the relay 76 which actuates the switch 80 in the circuit of the low temperature control relay 83.

In the apparatus as designed for the pasteurizing of milk the temperature control device is so constructed and arranged that at all temperatures below 160° F. contact 117 engages the arm 116. If the arm 104 is set to indicate any temperature below 160° and the arm 105 is set for any temperature below 170° a circuit is completed from the arm 104 through the contacts 117, arm 116, contact 120, contact 119 and the 160° terminal.

When the temperature rises to 160° the arm 116 engages the stop 118 and as the arm 104 continues to move above 160° the circuit will be broken between contact 117 and arm 116. If the arm 105 is set for any temperature above 170° contacts 119 and 120 are separated, thus breaking the circuit at this point. The arm 104 and the pusher 115 are so designed and arranged with respect to the arm 110 and the parts carried by the platform 109 that at any temperature one-half a degree or more below the predetermined setting of arm 105, the lever 110 and the pusher 113 will push the lever 111 against the contact 114 and close the circuit through the low temperature control relay 83. At the predetermined temperature setting of the arm 104 the lever 110 will be held in an intermediate position so that the lever 111 is not contacting with either the contact 114 or the contact 112. If the temperature rises one-half a degree or more above the predetermined setting of the arm 105 the arm 104 will push the lever 110 and permit the lever 111 to contact at 112.

Thus if the temperature of the liquid at the top of the heating chamber is one-half of a degree above or below the required temperature, contact will be made at 112 or 114 thus causing one of the relays 76 or 77 to be energized and the switch 80 or 81 actuated and the relay 83 or 84 actuated.

These relays 76 and 77 as previously mentioned also actuate the clutches which are geared to the motor 61 so as to rotate the shaft 62 and open or close the valve 34 as previously described.

In starting the apparatus it may be set so as to initially raise the temperature to a very high degree so as to scald out and thoroughly sterilize all the parts of the apparatus in which liquid is to flow. For instance water or a cleaning solution may be run through the apparatus at a temperature of say 180°. Preliminary to this the arm 105 would be set by hand to indicate the temperature of 180°. At the end of any desired preliminary treatment period the arm 105 is set back or immediately adjusted to the desired temperature of operation say 162°.

The liquid may be introduced through pipes 22 or 22' from any suitable source and passes upwardly through the pump 20 and through the pipe 36, the proportion of flow which passes through this pipe depending upon the setting of the valve 34. The liquid then passes upwardly through the preheating coil or regenerative section 24 and thence down and then through the filter 27 and into the heating chamber 25 between the electrodes 26.

The heated liquid passes through the insulating housing 28, thence through the sight chamber 29 to the sprinkler head 30. The outlets in this sprinkler head are arranged along the upper surface so that there is no possibility of air or gas collecting in the pipe.

The dimensions of the outlet openings 31 and 31' being graded from the inner to the outer end, a substantially uniform flow of the liquid is provided. The hot liquid passing down over the preheater 24 gives up part of its heat to the incoming cold liquid and is further chilled to any desired degree by the refrigerating coils 32 and 32', whence the liquid flows to any point of consumption or bottling.

Although the legal requirements of pasteurizing processes require the raw milk to be kept at a certain temperature, it is well known that the temperature does vary quite widely and cannot be depended upon to be uniform for any substantial time or for any considerable number of cans of milk. It is highly important therefore that the system be so designed as to insure the uniform pasteurization regardless of considerable variations in the temperature of the raw milk.

The temperature of the treated milk will depend upon the rate of flow of the milk and the current passing between the electrodes. It is obviously highly desirable for economic reasons that the milk receive a part of its heat from the hot treated milk and in fact the temperature rise may be conveniently divided into two stages in which say 75% must be added in the preheater and say 25% in the electrical treatment. In other words, three quarters of the increase in temperature is due to the preheater and only one-quarter to the electrical treatment.

This makes it possible to obtain the necessary electrical heating in a much shorter time than would be possible if all of the heat units had to be added by electrical treatment.

The apparatus is so designed that when it is desired to increase the temperature of the treated milk only approximately one-quarter of the required heat units will be added in the electrical part of the apparatus leaving the preheater to furnish the additional three-quarters of the increase.

It has been found practically impossible to satisfactorily control the temperature solely by means of the change of rate of flow of the liquid. It has also been found practically impossible to satisfactorily control the temperature solely by means of variation of electric current in the heating chamber. Only by a combination of these two adjustments working simultaneously has it been found possible to accomplish the desired result and hold the temperature of the product within the necessarily narrow limits permissible in treating milk.

When the switch 44 is closed a circuit is completed through the switch 45 and the pump motor 21 and also through the coil of the relay or contactor 85 which serves to shunt the resistance 37 out of the heating circuit.

It will be noted that if the relay coil 46 is energized it will open the circuit of the pump motor and thus stop the flow of liquid. The action of the relay 46 would also open the circuit of the contactor 85 which would open the switch 37' and throw the resistance 37 into the heater circuit. The closing of the switch 44 and the closing of the right hand branch of the switch 43 when the plug switch 42 is closed completes the circuit through the motor 61 for operating the valve 34.

When the switch 44 is closed and the switch 43 is closed the closing of the manual control switch 39 will, in addition to the action referred to in the two previous paragraphs, close the circuit through the relay or heater switch contactor 38' provided the cooling water is flowing over the electrodes so as to close the switch 40 and also provided there is a supply of liquid in the receptacle 48 so as to close the switch 41.

The breaking of the circuit by the separation of the parts of the plug switch 42 or by the stoppage of flow of the cooling water which actuates the switch 40 or by the emptying of the supply reservoir 48 will thus be seen to deenergize the circuit of the contactor relay 38' and open the heater circuit through the switch members 38.

When the apparatus is operating under normal conditions the switches 44, 43 and 39 are all closed, the parts of the plug switch 42 are connected, the cooling water switch 40 is closed and the liquid level switch 41 is closed. The pump circuit switch 45 is also closed and the switch 81 is closed so that a circuit is established through the electromagnet coil of the high temperature control contactor 84 and a circuit is also established through the coil of the back flow heating control contactor 85. The relay 83 is normally unenergized and the heater contactor relay 38' is energized. Relay 83 being unenergized the switch 35' is open. Relays 84 and 85 being energized, their switches 35'' and 37' are closed.

As a result the heating circuit extends through the switch 38, the resistance 35, the shunting switches 35'' and 37' and the heating electrodes 26. No current however is flowing through the temperature control device 99.

The switch 81 is normally closed but the two switches 80 and 82 are normally open so that the relays 83 and 46 are normally unenergized.

The constant speed motor 61, however, is in circuit and driving the train of gears of the control mechanism for actuating the liquid control valve 34 ready to open or close the valve in case the temperature control device 99 actuates the opening or closing valve clutch.

When the temperature of the treated milk drops below the normal sterilizing or pasteurizing temperature of 162° (but not below 160°) the temperature control device closes the circuit through the switch contact 114. This completes a circuit through the secondary of the transformer 100 and through the magnet of the relay 76. This magnet actuates the clutch 72 so as to produce an opening movement of the bypass valve 34 and thus slow down the flow of liquid through the main pipe. The slower movement of the liquid allows more time for heating and consequently results in raising the temperature of the liquid. This action of the magnet 76 also closes the circuit of the switch 80 which completes a circuit through the contactor relay 83 so as to shunt the resistance 35 and consequently increase the current flowing across the heater electrodes and accordingly tending to raise the temperature of the milk being treated.

The shunting of this resistance 35 may increase the temperature of the milk flowing between the electrodes approximately 1½° in five seconds. As soon as normal sterilizing temperature of 162° is again reached the contact 114 opens and restores all circuits to normal. During this extra heating period the valve 34 is opened slightly thus reducing the speed of flow of liquid and if this speed proves to be correct for the conditions existing normal operation will be resumed. If the adjustment has not been sufficient the contact 114 will again close and the action above described will again take place until the valve 34 has finally been placed in the correct operating position.

In case the temperature of the milk is raised above the normal sterilizing temperature, the temperature controller closes the contact 112 and thus completes the circuit through the magnet 77. This operates the other clutch 73 instead of the clutch 72 and allows the motor 61 to drive the mechanism for producing a closing movement of the electrically controlled valve 34 in the by-pass, thus speeding up the flow of the milk between the electrodes 26, 26. It also opens a circuit through the switch 81 which in turn opens the circuit through the contactor relay 84 and thus opens the switch 35″ and compels the heater current to flow through the resistance 351.

The increase in resistance in the heater circuit reduces the current flowing between the electrodes and through the milk stream and as a result the milk is less heated. As soon as the temperature descends to normal the contact 112 opens restoring the circuits to normal and shunting the resistance 351 out of the circuit.

If the action thus described does not result in holding the temperature of the milk down to normal, the action is repeated until the valve 34 is properly adjusted to ensure the passage of milk at the normal sterilizing temperature.

In case the temperature of the milk as it leaves the heating chamber falls below 160° which is the predetermined minimum, the temperature control device closes the contacts 116 and 117 so that the relay magnet 78 is energized. The closing of the switch 82 by the relay 78 while the milk is flowing through the heating chamber causes the relay 46 to be energized and the switch 45 to be opened so as to deenergize the pump motor 21. The energizing of the relay 46 also opens the circuit through the coils of the contactor relays 85 and 84 as a result of which actions the switches 37′ and 35″ are opened and the two resistances 37 and 351 are thrown into the heater circuit.

The resistance 37 is a high resistance which reduces the flow of current to about ¼ that normally flowing through the heater. The pump having been stopped by the opening of its motor circuit, the milk flows back through the heater at only about ¼ the speed of the forward flow under pump pressure. This backward flow is so slow that if the normal current strength were maintained in the heater the milk would be quickly overheated and ruined. It is for this reason that the electric current is greatly reduced in strength when the pump stops.

The temperature controller also closes the contacts 114, 121 which energize the relay magnet 76 which in turn throws in the clutch which causes the electrically controlled bypass valve 34 to open somewhat and cause the flow of milk through the main pipe to slow down and allow the milk to be treated for a greater length of time in the heating chamber.

When the pump motor 21 stops the milk flows back by gravity toward the raw milk tank or source of supply and when this level falls below the auxiliary electrode 91 at which time it will practically all have passed backward through the heating chamber for reheating, the circuit through the relay 46 will be interrupted because of the absence of the conducting stream of milk between the electrodes 91 and 26.

This will cause the relay 46 to be deenergized and permit the switch 45 to close so as to again start the pump and also restore the heater current to a normal value by shunting the resistances 37 and 351. The action of the pump raises a comparatively small quantity of milk upward in the heating chamber and when it strikes the auxiliary electrode 91 a circuit is again completed through the relay 46 and the pump circuit again interrupted.

The milk however has contacted with a temperature sensitive bulb 101 above the heating chamber and if the milk temperature is now high enough the temperature control device 99 will act to open the circuit of the relay 46 at the point 116 and 117 and allow the pump to resume operation. If the temperature of the milk is not yet high enough the action will be repeated, the pump will stop, the milk will flow back for retreatment and the steps will be repeated until the milk becomes hot enough to satisfy the conditions of the system when the parts of the temperature controller 99 will be restored to normal and the process will proceed.

It will be noted from this action that it is possible to start the plant with the safety control device and bring the milk up as far as the electrode 91 no matter whether it is hot enough for proper sterilization or not but that the milk will not be permitted to escape from the system until it is up to the proper temperature.

It is thus possible to start the plant on cold milk without going through the preliminary operation of bringing the apparatus up to normal stabilized temperature by other means.

It will be understood, of course, that shut downs of the plant that may occur during milk treatment caused by failure of electric power, failure of water flow on the electrodes or inadequate supply of milk will, of course, throw the whole sequence of operation out of balance.

As soon as normal conditions, however, are restored operation will automatically be resumed and if the temperature of the milk coming through is not up to the proper point the action as outlined above will take place until the milk is treated up to the proper temperature and the correct position of the regulating valve 34 is automatically found. Normal operation at normal temperature will then be automatically resumed.

Any suitable form of warning device 47 may be employed to warn the operator that the supply of milk needs replenishing. It will be noted, however, that no other circuit is disturbed by the action of this warning device and no change in operation will take place.

In case the raw milk supply is exhausted the switch 41 is opened and the circuit of the power relay 38′ is broken and the main heating circuit is opened. If milk remains in the heating chamber the temperature will of course immediately fall and the controller 99 will act as previously described to open the pump motor circuit and stop the pump.

When the raw milk supply is exhausted the flow through the pump will naturally stop and that portion which happens to remain in the heating chamber would, if the power remained on, become rapidly overheated. The shutting off of the power, however, by the opening of the switch 41 avoids this danger.

Failure of the cooling water to pass over the electrodes opens the switch 40 and thus kills the power circuit as above described. This action is also quite necessary because failure of the cooling water on the outside of the electrodes would permit them to become overheated and burn the milk, thus not only imparting a disagreeable flavor to the milk but subjecting the electrodes to a possibility of damage from overheating.

In case the milk supply has become low and the heating circuit opened, replenishing of the supply of raw milk will close the switch 41 and permit the system to automatically resume operation.

Similarly if the cooling water has been cut off and the heating stopped, restoration of the flow of cooling water on the electrodes will close the switch 40 and automatically restore the circuit to its normal operating condition.

In this process the milk is raised from its normal temperature to approximately 162 degrees, is held for 15 seconds at that temperature and is then cooled down to something below 50 deg. F., at which time it is ready for bottling.

The milk is driven by a pump, first through regenerative or heat exchange coils where it is raised in temperature by the flow of the treated 162 deg. milk down across the outside of these coils; it then passes through the electrical treating unit where an electric current is caused to flow through the body of milk, which raises its temperature to the final treating point of approximately 162 degrees. It then flows through a chamber of such dimensions that it takes approximately 15 seconds to pass through, and from there it is caused to flow in a thin film down across the outside of the regenerative coils.

Thus two methods are employed to bring the milk up to its final temperature of 162 degrees. First, by conductive heat from the treated milk and then by electrically generated heat by current flowing across the milk itself.

The control of heat is accomplished by varying the speed of the milk flow through the system. An increase of speed through the treating unit will cause it to be exposed a shorter length of time to the electric current, or a decrease in speed will expose it a greater length of time. Naturally, the longer it is exposed to the electric current the higher its temperature will become.

The milk, in its flow through the system, picks up approximately three quarters of its increased temperature in the heat exchange or regenerative coils, and the other quarter is added in the electrical treating chamber. The amount of heat that it picks up in either the regenerative coils or in the treating chamber is proportional to its rate of flow. Thus, if the rate of flow is changed so as to make one degree difference in the amount of electrical heat that is picked up, three degrees difference will be made in the amount of heat picked up in the regenerative coils.

It takes about 5 seconds for the milk to pass through the electrode chamber and reach the temperature control bulb; it takes about 25 seconds for the milk to pass through the regenerative coils and through the electrode chamber and reach the temperature control bulb.

Supposing the temperature of the milk were one degree off, a correction in valve position would at the end of 5 seconds—the time it takes it to flow through the electrode chamber—bring it to the proper temperature by changing its speed of flow through the electrode chamber. This same change of speed of flow, however, has also taken place through the regenerative coils and 25 seconds after the correction has been made—the time it takes the milk to flow through the regenerative coils and reach the temperature control bulb—I get a further change of three times the original correction in the same direction.

This would require a continual readjustment, first one way and then the other, of the position of the valve and keep increasing and decreasing the speed of flow, never being able to strike the proper point to get an even flow, causing a hunting of the controls and a great variation of temperature plus or minus the required point.

I overcame this difficulty in the following manner:—

Supposing the temperature becomes one degree higher than it should be, the valve immediately starts to adjust to increase the speed of flow. Simultaneously with this adjusting movement of the valve, a slight amount of resistance is thrown into circuit with the current passing through the milk stream. The action of the valve and the lowering of the current passing through the milk both tend to reduce this temperature and, as soon as the proper temperature is reached, the valve ceases to adjust. At the same time the resistance goes out of the circuit with the current passing through the milk stream, which tends to again increase the temperature of the flowing milk. By the time this effect takes place, the increased speed of flow through the regenerative coils begins to have its effect in a tendency to still further lower the temperature of the treated milk. This tendency on the part of the resistance going out of circuit raising the milk temperature, and the effect of the regenerative coils lowering it, means that they neutralize each other and leave the temperature at the proper point.

Supposing the temperature of the milk is one degree too low, the valve starts to adjust to decrease the speed of flow so that the milk will be exposed to the electrical treatment for a longer period. Simultaneously a resistance which is normally in circuit during the treatment is cut out of circuit, which boosts the amount of current passing through the milk stream. The combined effect of the increased current and valve adjustment brings the milk back to its normal temperature of approximately 162 degrees.

The instant this occurs, the valves ceases to adjust and the resistance comes back into circuit with the current flowing through the milk. At about the time this increased resistance begins to again lower the temperature of the milk, the decreased speed of flow through the regenerative coils causing it to pick up the higher temperature, will begin to have its effect on the temperature of the treated milk, thus neutralizing the effect of the increased resistance, leaving the temperature at approximately the position at which it was adjusted.

Because of the fact that the milk changes three degrees through the regenerative coils for every one degree of change made in the treating chamber, only one quarter as much valve adjustment should be made as would be necessary to correct the temperature of the milk passing through the treating chamber alone. By throwing the resistance into or out of circuit the temperature is corrected in about a quarter of the time that it would be by valve adjustment alone. This permits the valve to move only one quarter as far as it normally would to correct temperature without the assistance of the resistance; then when the effect of the changed flow through the regenerative coils comes in, the other three quarters of the change is produced and the temperature is correct.

From the foregoing it will be seen that the system serves to regulate temperature of the treated milk very accurately without requiring manual adjustment of valves or current while the system is in operation. It has been found that this apparatus operates in a practical and satisfactory manner to pasteurize milk to an unusually high degree and at a very high rate of speed and at a minimum of expense.

While I have described the apparatus as especially designed for the treatment of milk and have referred to certain temperature limits as desirable, I wish it understood that the invention is not limited to the treatment of milk nor to any particular temperature limits as the apparatus is capable of design and adjustment to suit other requirements as to maximum and minimum temperature limits.

I claim:

1. Apparatus for pasteurizing liquid which includes a liquid supply system including an electrically driven pump having a valve-controlled by-pass, a preheating device for the liquid, means for flowing the electrically heated liquid over the preheating device, means for further electrically heating the liquid and means regulated by the increase of temperature of the liquid above a predetermined temperature as it leaves the electrical heating means for partially closing the by-pass valve and increasing the rate of flow of the liquid to the heating means, thermostatically controlled means for automatically stopping the pump motor and pump when the temperature of the heated liquid falls below a predetermined degree and allowing the heated liquid to flow back to the electrical heating means, and thermostatically controlled means for automatically restarting the pump motor and pump when the liquid is again raised to the predetermined temperature.

2. Apparatus for pasteurizing liquid which includes a liquid supply system including an electrically driven pump having a valve-controlled by-pass, a preheating device for the liquid, means for flowing the electrically heated liquid over the preheating device, means for further electrically heating the liquid and thermostatically operated means regulated by the increase of temperature of the liquid above a predetermined temperature as it leaves the electrical heating means for partially closing the by-pass valve and increasing the rate of flow of the liquid to the heating means and at the same time increasing the current in the circuit of the electrical heating means, thermostatically operated means for automatically starting or stopping the pump motor and pump when the temperature of the heated liquid rises or falls above or below a predetermined degree.

3. Apparatus for pasteurizing liquid which includes a liquid supply system including an electrically driven pump, a preheating device for the liquid, means for flowing the electrically heated liquid over the preheating device, an electrode chamber for further electrically heating the liquid and means regulated by the increase of temperature of the liquid above a predetermined temperature as it leaves the electrode chamber for increasing the rate of flow of the liquid to the electrode chamber and means for stopping the forward flow of the liquid when the temperature of the heated liquid falls below a predetermined degree and allowing the heated liquid to flow back to the heating means and at the same time reducing the current passing through the electrode chamber.

4. In an electric heating system for liquids, a chamber having electrodes for the passage of alternating current, means for forcing liquid to flow forwardly through said chamber, thermostatically operated means controlled by the temperature of the liquid after it passes between the electrodes for automatically stopping the flow of liquid when its temperature falls below a certain predetermined value and permitting the liquid to return through the electrode chamber, means for decreasing the current passing through the chamber when the liquid returns through the chamber, and thermostatically controlled means for automatically restarting the forward flow when the liquid has returned to a certain level in the chamber.

5. In an electric heating system for liquids, a chamber having opposed electrodes arranged for the passage of alternating current between them, an electric motor driven pump for forcing liquid to flow through said chamber, thermostatically operated means controlled by the temperature of the liquid after it passes between the electrodes for automatically stopping the pump when the temperature of the liquid falls below a predetermined temperature and permitting the liquid to return through the chamber, automatically operated means for decreasing the current passing through the chamber when the liquid returns through the chamber, and automatically operated means including a supplemental electrode adjacent to the electrode chamber and means for automatically closing the pump motor circuit for restarting the flow of the liquid when the liquid has returned to a predetermined level in the electrode chamber.

6. In a liquid heating system, an electrode chamber, an electric motor driven pump for forcing liquid through said chamber, a source of alternating current applied to the electrode chamber including a resistance normally in circuit therewith and other resistances normally out of circuit but adapted to be separately connected in the circuit, means for automatically stopping the pump when the temperature of the heated liquid falls below a predetermined low temperature, means for inserting one of the said other resistances in circuit when the pump stops, means for inserting another of said resistances in circuit when the temperature of the liquid goes above a certain predetermined degree, and means for automatically cutting out the first mentioned resistance when the temperature falls below a certain degree.

7. In a liquid heating system, an electrode chamber, an electric motor driven pump for forcing liquid through said chamber, a source of alternating current applied to the electrode chamber, means for automatically stopping the pump when the temperature of the liquid falls to a certain degree, means for automatically restarting the pump when the temperature has risen to a predetermined degree, means for automatically decreasing the current strength when the pump stops, means for automatically further decreasing the current strength when the temperature of the liquid rises above a certain degree, and means for automatically increasing the current strength when the temperature falls below a certain degree.

8. An electric liquid heating system having heating means provided with electrodes and means for forcing the liquid between the electrodes and allowing the heated liquid to flow backward through the heating means when it fails to reach a predetermined temperature, automatically operated means for decreasing the rate of flow of liquid between the electrodes and reducing the strength of the current when the temperature of the heated liquid falls below a predetermined temperature and stopping the flow of liquid at a predetermined temperature, cooling means for the electrodes, automatically operated means for stopping the flow of the liquid when the cooling means fails, and means for automatically restarting the flow of the liquid when it falls to a predetermined level in the heating means.

9. Pasteurizing apparatus including a circulating system for the liquid which includes a liquid supply tank, a motor driven pump, a regenerative preheater, a heating chamber having electrodes for the application of an alternating current and means for flowing the heated liquid over the preheater, a source of current to be applied to the electrodes including means for increasing and decreasing the applied voltage, a motor and circulating system including means for causing liquid to flow backwardly from the heating chamber at a rate slower than the normal rate of flow created by the action of the pump, and thermostatically actuated means controlled by the temperature of liquid beyond the heating chamber for stopping the pump action when the temperature of the heated liquid falls below a predetermined point and means for starting the pump action when the liquid level in the heating chamber falls below a predetermined position, said thermostatically actuated means also including means for reducing the voltage applied to the electrodes when the action of the pump is stopped.

10. In an electrically heated pasteurizing system, an electric motor driven pump for forcing liquid through the heater and a relay for opening the motor circuit when liquid is passing through the heater at a temperature below a predetermined limit so that the liquid will flow backward through the heater.

11. In an electrically heated pasteurizing system, an electric motor driven pump for forcing liquid through the heater, a relay for opening the motor circuit when liquid is passing through the heater at a temperature below a predetermined limit so that the liquid will flow backward through the heater and means for deenergizing the relay and closing the pump motor circuit when the liquid rises in the heater.

12. In a liquid treating system, a heating chamber, means for applying an electric current to said chamber, means for forcing liquid in one direction through said chamber while heating in a normal manner, means for reversing the flow of liquid when the temperature fails to reach a certain predetermined degree, said liquid flowing at a reduced rate in the reverse direction, means for substantially reducing the electric current when the liquid flow is reversed and means for again reversing the flow of liquid when it has been reheated and for increasing the electric current.

13. A system as set forth in claim 12 having means for increasing the rate of flow of the liquid when it reaches a predetermined temperature.

14. In a liquid treating system, a heating chamber, a pump for raising the liquid and forcing it through said chamber, a temperature control device having means for automatically decreasing the rate of flow when the temperature of the heated liquid falls below a certain temperature and means for automatically stopping the pump when the temperature of the heated liquid falls below a predetermined lower minimum and means for automatically starting the pump after the liquid has been reheated to a predetermined temperature.

15. A system as set forth in claim 14 having means for increasing the rate of flow of the liquid when its temperature reaches a predetermined temperature.

16. In a liquid treating system, an electric heating chamber, means for forcing liquid through said chamber, means for decreasing the rate of flow when the temperature of the liquid falls below a certain value, means for increasing the rate of flow when the temperature of the liquid rises to a predetermined temperature, means for decreasing the current when the rate of flow falls below a certain rate, and means for increasing the current when the temperature of the liquid falls below a predetermined temperature.

17. In a liquid treating system, a liquid circulating conduit including a pump, a pre-heater, an electric heater and a sprinkler pipe discharging over the pre-heater, said sprinkler pipe having discharge openings arranged along its upper surface so as to avoid air pockets, said openings being larger at the inner end of the sprinkler pipe than at the outer end and graded in size between the ends of the pipe in the manner specified.

18. Apparatus for pasteurizing liquid which includes a liquid supply system including an electrically driven pump having a by-pass, a preheating device for the liquid, means for electrically heating the liquid and means regulated by the increase of temperature of the liquid above a predetermined temperature as it leaves the electrical heating means for partially closing the by-pass and increasing the rate of flow of the liquid to the heating means, thermostatically controlled means for automatically stopping the pump motor and pump when the temperature of the heated liquid falls below a predetermined degree and allowing the heated liquid to flow back to the electrical heating means, and thermostatically controlled means for automatically restarting the pump motor and pump when the liquid is again raised to the predetermined temperature.

19. Apparatus for heating liquid which includes, a circulating system having a preheater section, a heating chamber having electrodes, a sprinkler above the preheater, a pump for forcing liquid forward through the preheater and the heating chamber and discharging the heated liquid from the sprinkler upon the preheater, thermostatically controlled means for increasing the rate of forward flow through the circulating system when the temperature of the heated liquid rises to a predetermined temperature, thermostatically controlled means for stopping the forward flow of the liquid when the temperature of the heated liquid falls below a predetermined temperature so that the heated liquid flows back to the heating chamber for reheating, means for reducing the heating current when the liquid is being reheated and means for automatically restarting the forward flow when the liquid reaches a predetermined temperature.

20. In a pasteurizing apparatus, a heater for the liquid, a pump for passing the liquid through the heater, means responsive to the temperature of the liquid after it has passed said heater for increasing the heating of the liquid when its temperature drops slightly from a normal pasteurizing value and for reducing the energy input to the heater when the liquid temperature rises slightly above said normal value, and means responsive to said last mentioned means for stopping the pump and repassing the liquid through the heater when the temperature of liquid which has passed the heater falls below a predetermined minimum which is below that for normally increasing the heating of the liquid, means for tempering the heater during its normal operation and means for stopping the heating action of the heater in response to a reduction of said tempering means.

21. In a liquid heating system, a heater, a pump having a substantially constant load for passing liquid through the heater, only a portion of the liquid being at times adapted to pass through the heater, a valve controlling the portion of liquid from the pump which passes through the heater and means for controlling said valve in response to the temperature of the liquid coming directly from the heater to control the rate of liquid flow through the heater.

22. In a liquid heating system, a heater, a pump having a substantially constant load for passing liquid through the heater, only a portion of the liquid being at times adapted to pass through the heater, a valve controlling the portion of liquid from the pump which passes through the heater, means for controlling said valve in response to the temperature of the liquid coming directly from the heater to control the rate of liquid flow through the heater, and means for simultaneously controlling the energy supplied to the heater in response to the temperature of the liquid which has passed through the heater.

23. In a liquid heating system, a heater, a substantially constant load pump for passing liquid through the heater, a valve controlling the portion of liquid from the pump which passes through the heater, means for controlling said valve in response to the temperature of the liquid which is passed through the heater to control the rate of liquid flow through the heater, means for simultaneously controlling the energy supplied to the heater in response to the temperature of the liquid which has passed through the heater and means to reduce the tendency of said control means to hunt by automatically retrogressing the change in energy supplied to said heater when the change in rate of liquid flow through the heater stops.

24. In a liquid heating system, a heater, an electric motor, a pump driven by the motor for passing liquid through the heater, a bypass for returning some of the liquid to the pump without passing through the heater, a valve in said bypass for controlling the amount of liquid through the bypass and the rate of liquid flow through the heater and means for controlling said valve in response to the temperature of the liquid after it is passed through said heater.

25. In a liquid heating system, a heater, a substantially constant load pump for passing liquid through the heater, a valve controlling the portion of liquid from the pump which passes through the heater and means for controlling said valve in response to the temperature of the liquid which is passed through the heater to control the rate of liquid flow through the heater, said temperature control means being adapted to close said valve and increase the rate of liquid flow through the heater when the temperature of the liquid beyond the heater reaches a predetermined value and to open the valve and reduce the rate of flow through the heater when the temperature of the liquid beyond the heater reaches another predetermined value.

26. In a liquid heating system, a heater, an electric motor, a pump driven by the motor for passing liquid through the heater, a bypass for returning some of the liquid to the pump without passing through the heater, a valve in said bypass for controlling the amount of liquid through the bypass and the rate of liquid flow through the heater, means for controlling said valve in response to the temperature of the liquid after it is passed through said heater and means for simultaneously controlling the energy supplied to the heater in response to the temperature of the heated liquid.

27. In a pasteurizing apparatus, a heater for liquid, means for passing liquid through the heater, means responsive to temperature of the liquid after it has passed the heater for increasing or decreasing the energy input to the heater when the liquid temperature has fallen or risen within predetermined limits, means for further increasing the energy input to the heater when the liquid temperature has fallen below the lowest of said aforementioned predetermined limits and above another limit, means for stopping the normal liquid flow through the heater and flowing the liquid back through the heater under a greatly reduced energy input when the temperature of the liquid has fallen below said other limit, and means for automatically again flowing the liquid through said heater in a normal direction.

28. In a liquid heating system, an electric heater for the liquid, an electric motor, a pump driven by the motor for passing liquid through the heater, mechanism for simultaneously controlling the electric current input to the heater and the rate of liquid flow through the heater in response to the temperature of the heated liquid and means to reduce the tendency of said mechanism to hunt by automatically retrogressing the change in current through the heater when the change in rate of liquid flow ceases.

29. In a liquid heating system, an electric heater for the liquid, an electric motor, a pump driven by the motor for passing liquid through the heater, mechanism for simultaneously controlling the electric current input to the heater and the rate of liquid flow through the heater in response to the temperature of the heated liquid and means to reduce the tendency of said mechanism to hunt by automatically retrogressing the change in one of said simultaneously controlled conditions when the change in the other of them is stopped in response to the liquid temperature beyond the heater reaching a predetermined value.

30. In a liquid heating system, a heater, an electric motor, a pump driven by the motor for passing liquid through the heater, a bypass for returning some of the liquid to the pump without passing through the heater, a valve in said bypass for controlling the amount of liquid through the bypass and the rate of liquid flow through the heater, means for controlling said valve in response to the temperature of the liquid after it is passed through said heater, means for simultaneously controlling the energy supplied to the heater in response to the temperature of the heated liquid and a heat exchanger adapted to heat the liquid supplied to the heater from the heat in the liquid which is passed through the heater, a greater number of degrees than does the electric heater.

31. In a liquid heating system, an electric heater for the liquid, an electric motor, a pump driven by the motor for passing liquid through the heater, mechanism for simultaneously controlling the electric current input to the heater and the rate of liquid flow through the heater in response to the temperature of the heated liquid, means to reduce the tendency of said mechanism to hunt by automatically retrogressing the change in current through the heater when the change in rate of liquid flow ceases and a heat exchanger adapted to supply more energy to the liquid than does the electric heater, said heat exchanger heating the liquid for the heater from the liquid which has already passed through the heater.

32. In a liquid heating system, a heater, an electric motor, a pump driven by the motor for passing liquid through the heater, a bypass for returning some of the liquid to the pump without passing through the heater, a valve in said bypass for controlling the amount of liquid through the bypass and the rate of liquid flow through the heater, means for controlling said valve in response to the temperature of the liquid after it is passed through said heater, means for simultaneously controlling the energy supplied to the heater in response to the temperature of the heated liquid, means for stopping the pump and allowing the liquid to flow back through the heater, and means for automatically restarting said pump for repassing the liquid through the heater when the temperature of the heated liquid is below a predetermined value.

33. In a liquid heating system, a supply tank for liquid to be heated, an electric heater having electrodes for heating the liquid, means for passing cooling liquid adjacent the electrodes of said heater, an electric motor, a pump driven by said motor for passing liquid through the heater, and means for stopping said motor in response to either too low a temperature of the liquid which has passed through the heater, too low a liquid supply in said tank, or an inadequate supply of cooling liquid for said heater electrodes.

34. In a milk pasteurizing system, a heat regenerative section, an electrode chamber, a pump for forcing milk through the regenerative section and the electrode chamber, and means for flowing the heated milk over the regenerative section, thermostatically controlled means for decreasing the rate of flow of the milk in case the temperature of the heated milk falls a predetermined amount and for simultaneously boosting the current passing through the milk.

35. In a milk pasteurizing system, a heat regenerative section, an electrode chamber, a pump for forcing milk through the regenerative section and the electrode chamber, and means for flowing the heated milk over the regenerative section, thermostatically controlled means for decreasing the rate of flow of the milk in case the temperature of the heated milk falls a predetermined amount and for simultaneously boosting the current passing through the milk and means for stopping the forward flow of milk and reducing the current flowing through the milk in case the temperature of the milk falls below a certain lower temperature.

36. A milk pasteurizer including a chamber having electrodes and a current supply for heating the milk passing through the chamber, a pump for forcing milk upwardly through the chamber, means for stopping the upward flow of milk in case its temperature is below a certain predetermined degree and allowing the milk to return by gravity through the chamber, an auxiliary electrode in the chamber above the heating electrodes and a relay connected to the auxiliary electrode to start the upward flow of milk when the circuit through the auxiliary electrode is broken by the falling of the milk in the chamber.

37. A milk pasteurizer including a chamber having electrodes and a current supply for heating the milk passing through the chamber, a pump for forcing milk upwardly through the chamber, means for stopping the upward flow of milk in case its temperature is below a certain predetermined degree and allowing the milk to return by gravity through the chamber, an auxiliary electrode in the chamber above the heating electrodes and a relay connected to the auxiliary electrode to start the upward flow of milk when the circuit through the auxiliary electrode is broken by the falling of the milk in the chamber, a temperature responsive device in the chamber and means actuated thereby for continuing the upward flow when the temperature reaches a predetermined degree.

38. In a milk pasteurizing system, a circulating system including a heat regenerative coil, an electrode heating chamber, an inspection chamber above the heating chamber, a spray tube connected to the inspection chamber and having outlets in the upper wall of the spray tube so as to prevent the collection of air bubbles from the hot milk in the tube and deliver hot milk in a cascade over the outside of the spray tube and over the regenerative coil and means for forcing milk through the regenerative coil, then through the heating chamber, then through the inspection chamber and then through the spray tube.

39. In a milk treating system, a circulating system including an electrode chamber in which the milk is heated by the passage of an electric current, a filter beneath the electrode chamber, a regenerative section heated by the output of the heater, a motor driven pump for forcing the milk through the regenerative section, then through the filter and then through the heater to deliver the heated milk to the outside of the regenerative section, thermostatically actuated means governed by the temperature of the treated milk for controlling the flow of milk through the heater and for stopping the upward flow of milk through the filter and through the heater and permitting the partially heated milk to flow backward through the heater and through the filter.

40. In a liquid heating system, a circulating system including a regenerative section, an electrode heating chamber, and means for flowing the heated liquid over the regenerative section, a pump for forcing liquid through the regenerative section, the heating chamber and over the regenerative section, means controlled by the temperature of the liquid as it leaves the heating chamber to increase the rate of flow of the liquid in case the temperature of the liquid in the chamber rises above a predetermined maximum and means for simultaneously decreasing the current passing through the heating chamber so as to reduce the temperature of the milk passing from the heating chamber.

41. A liquid pasteurizing system comprising a heating chamber, heating means for said chamber, a source of liquid supply, means for forcing liquid from said source to said chamber, a heat regenerator interposed between said source and said heating chamber receiving the liquid from said source and also the heated liquid from said heating chamber in heat exchanging relation so that the liquid from said source is substantially heated before it is received in said heating chamber where an additional increment of heat is applied to bring said liquid up to a predetermined temperature, the relation of the heating chamber, regenerator and source of supply being such that when said liquid forcing means stops, liquid flows back through the system to said source of supply, means controlling the rate of flow of liquid through said system, means controlling the energization of said heating means, and thermostatic means responsive to the temperature of the liquid after it has been heated in said heating chamber controlling both said rate and energization controlling means so that when said temperature rises above a predetermined value said rate is increased and said energization of said heating means is reduced to reduce the temperature of said liquid and conversely when said temperature falls below a predetermined degree said rate is reduced and said energization increased to increase the temperature of said liquid, the energization of said heating means being controlled to compensate for the varied heating effect upon said liquid in said regenerator due to variations in the rate of flow so as to obviate hunting in the control of said temperature.

42. A liquid pasteurizing device comprising an electrode chamber having electrodes, a pump for forcing liquid to said chamber related to said chamber so that when said pump stops the liquid flows back through said chamber, an electric motor for driving said pump, an energizing circuit for said motor, a switch biased to a closed position in said energizing circuit, an electro-responsive device for opening said switch, an energizing circuit for said electro-responsive device, a switch in said energizing circuit, an auxiliary electrode in said circuit related to the electrodes in said chamber to complete an energizing circuit for said electro-responsive device when liquid contacts both of said electrodes and said second-named switch is closed, and a thermostatic device having a heat responsive element adjacent said auxiliary electrode arranged to control said second switch to close it when the temperature of the liquid at said heat responsive element falls below a predetermined degree and thereby effect the energization of said electro-responsive device to open said first switch to stop said pump to thereby permit the liquid to flow back through said electrode chamber, the liquid continuing to flow back until said auxiliary electrode is uncovered, whereupon said first switch is closed to restart said pump.

43. Apparatus for pasteurizing a liquid comprising means for heating said liquid in transit, a collecting chamber above said heating means, a source of liquid supply, a conduit for conducting said liquid to said heating means from said source of supply, means for pumping said liquid from said source of supply through said conduit to said heating means, means controlling said pumping means responsively to the temperature of the liquid leaving said heating means so that when said temperature increases above a predetermined degree, the liquid is pumped at an increased rate and when said temperature decreases below a predetermined degree said liquid is pumped at a reduced rate and means for stopping said pump when said temperature falls below a predetermined degree to permit said liquid to flow back from said collecting chamber through said heating means for further treatment.

44. Apparatus for pasteurizing a liquid comprising means for heating said liquid in transit, a collecting chamber above said heating means, a source of liquid supply, a conduit for conducting said liquid to said heating means from said source of supply, means for pumping said liquid from said source of supply through said conduit to said heating means, means controlling said pumping means responsively to the temperature of the liquid leaving said heating means so that when said temperature increases above a predetermined degree, the liquid is pumped at an increased rate and when said temperature decreases below a predetermined degree said liquid is pumped at a reduced rate and means controlling said pump automatically to stop the flow of liquid through said heating means when the temperature of the heating liquid falls below a lower predetermined value, and for automatically restarting said pump when the temperature of said liquid is again raised to a predetermined value.

45. An electric milk pasteurizing system comprising a heating chamber, heating means in said heating chamber, a source of milk supply below the level of said heating chamber, conduit means between said source of supply and said heating chamber, a pump connected in said conduit means for delivering said milk to said heating chamber, valve means controlling the rate of flow to said heating chamber, means responsive to the temperature of the milk that has been heated in said heating chamber controlling said valve means to increase the rate of flow when said temperature increases above a predetermined degree and to decrease the rate of flow when said temperature decreases below a predetermined degree, and further, controlling said pump to stop the flow entirely when said temperature falls below a predetermined minimum, the milk thereupon flowing back through said heating chamber to be reheated, and to control said pump to again deliver said milk when said milk is again raised above a predetermined minimum temperature.

46. A liquid pasteurizing system comprising an electrode chamber, electrodes in said chamber, an energizing circuit for said electrodes, a source of liquid supply, conduit means for conducting liquid from said source of supply to said electrode chamber, means for supplying cooling fluid to said electrodes and switching means controlling said energizing circuit responsively to the flow of cooling water and the quantity of liquid in said source of supply for deenergizing said electrodes either when said flow ceases or said liquid supply is depleted.

47. A liquid pasteurizing system comprising an electrode chamber, electrodes in said chamber, an energizing circuit for said electrodes, a source of liquid supply, conduit means for conducting liquid from said source of supply to said electrode chamber, a pump in said conduit means for forcing said liquid to said electrode chamber, means for supplying cooling fluid to said electrodes, switching means controlling said energizing circuit responsively to the flow of cooling water, and the quantity of liquid in said source of supply for deenergizing said electrodes either when said flow ceases or said liquid supply is depleted, and automatically operated means for stopping said pump when the supply of said cooling fluid fails.

48. A liquid pasteurizing system comprising a heating chamber, heating means in said chamber, a source of liquid supply, means for forcing liquid from said source to said chamber, a heat regenerator interposed between said source and said heating chamber receiving the liquid from said source and also the heated liquid from said heating chamber in heat exchanging relation so that the liquid from said source is substantially heated before it is received in said heating chamber where an additional increment of heat is applied to bring said liquid up to a predetermined temperature, means controlling the rate of flow of liquid through said system, means controlling the energization of said heating means, and thermostatic means responsive to the temperature of the liquid after it has been heated in said heating chamber controlling both said rate and energization controlling means so that when said temperature rises above a predetermined value said rate is increased and said energization of said heating means is reduced to reduce the temperature of said liquid and conversely when said temperature falls below a predetermined degree said rate is reduced and said energization increased to increase the temperature of said liquid, the energization of said heating means being controlled to compensate for the varied heating effect upon said liquid in said regenerator due to variations in the rate of flow so as to obviate hunting in the control of said temperature.

49. In a pasteurizing apparatus, a heater for the liquid, a pump for passing the liquid through the heater, means responsive to the temperature of the liquid after it has passed said heater for increasing the heating of the liquid when its temperature drops slightly from a normal pasteurizing value and for reducing the energy output of the heater when the liquid temperature rises slightly above said normal value, and means responsive to said last mentioned means for stopping the pump and repassing the liquid through the heater when the temperature of liquid which has passed the heater falls below a predetermined minimum which is below that for normally increasing the heating of the liquid.

BENJAMIN E. GETCHELL.